Patented Sept. 1, 1931

1,820,917

UNITED STATES PATENT OFFICE

CECIL T. LANGFORD AND ABRAHAM J. TEPLITZ, OF PONCA CITY, OKLAHOMA, ASSIGNORS, BY MESNE ASSIGNMENTS, TO CONTINENTAL OIL COMPANY, OF PONCA CITY, OKLAHOMA, A CORPORATION OF DELAWARE

METHOD FOR SEPARATING BITUMEN FROM BITUMINOUS SANDS AND SIMILAR BITUMINOUS MATERIALS

No Drawing.    Application filed April 29, 1927. Serial No. 187,696.

This invention relates to improvements in methods of separating bitumen from bituminous sands or similar bituminous materials, and, more specifically the invention, comprises agitating the bituminous material with an aqueous solution or liquid reagent for the purpose of effecting the separation referred to.

In the reduction of the invention to practice, numerous experiments were conducted with the bituminous sands of northern Alberta, commonly known as Canadian tar sand, but it is to be understood that the invention is not limited to operation upon this particular material. Aqueous solutions of many substances, notably soaps, bases, and salts of strong bases and weak acids, have been used effectively in separating bitumen from this material. The unaltered bitumen contains saponifiable matter which reacts with solutions containing hydroxyl ions to form soaps. The soaps formed during the treatment of the bituminous sand with reagents of the type mentioned above produce a lowering of the surface tension of the solution. In fact, it has been found that a sodium hydroxide solution with an initial surface tension of 75 dynes per centimeter has a surface tension of 40 dynes per centimeter after being used for treating bituminous sand. In like manner the surface tension of a solution of sodium borate is reduced from 75 to 45 dynes per centimeter.

It is probable that the cleansing action of the solutions which have been found effective is due to the low surface tension of the solutions. The mechanism of the process is generally explained in the following manner: Consider a sand particle S covered with a film of bitumen B and in contact with an aqueous solution A. Call the interfacial tension between sand and bitumen $\delta_{SB}$, that between sand and solution $\delta_{SA}$, and that between solution and bitumen $\delta_{AB}$. The phases will rearrange and the bitumen will be removed from the sand, if as a result of the process there is a decrease in the total surface energy of the system. That is, the bitumen will be removed from the sand if $$\delta_{SB} > \delta_{SA} + \delta_{AB}$$

While it is impossible to determine the magnitude of the first two quantities, it is probable that with a reduction in the surface tension of the aqueous solution, the interfacial tensions on the right side of the mathematical expression are reduced enough to permit the rearrangement.

Given the proper solution, however, it is then necessary to bring the substances in intimate contact. Consider a sand grain completely covered with a film of bitumen. Now if the aqueous solution be merely poured over such a particle, there is no opportunity for contact. If the bitumen is to be removed, and the sand become covered with solution instead, then the solution must be brought in contact with the sand. The combination of an effective non-solvent solution with a device which will bring about intimate contact between the sand grains and the solution is one object of the invention.

In processes heretofore employed for removing the bituminous material from the sands upon which the material is collected it has been common to employ a solvent, and to stir the mixture of bituminous sands and the solvent in such a manner that the bituminous material is slowly dissolved in the solvent. Thus, at the completion of such a separation two phases result: (a) the clean sands, and (b) the solution of bituminous material and solvent. In the present invention it is intended to employ some suitable form of a device, such as a mill, which will rub the grains of sand against one another and against the operating parts of the device in such a manner that the grains are wiped free of the bituminous material whereupon the alkaline substance completes the cleaning or separating process by stripping from the grains any bituminous material remaining thereon. In the operation of the process it is necessary only to expose the smallest conceivable area of the surface of a grain of sand to the solvent which enters immediately the exposed area and then works itself between the bituminous material and the grain of sand separating completely the two in such a manner that at the completion of the separation three phases result: (a) the bituminous material, (b) the sand grains, and (c) the alkaline substance. In the practice of this process it is desirable that the grains of sand have their outer surfaces rubbed free of material collected thereon, without crushing the grains. Devices suitable for performing such an operation comprise ball mills, tube mills, Chilean mills, centrifugal mills, buhr mills, attritian mills, etc.

One way in which the novel process may be carried out on a laboratory scale is as follows: 200 parts by weight of the bituminous sand may be heated to about 70° C. and triturated approximately three minutes with a mortar and pestle with 50 parts by weight of a tenth molal sodium hydroxide solution. At the end of this treatment it will be observed that most of the bitumen has been freed from the sand. Upon subsequently dropping the pulpy mass into hot water and stirring for about twelve minutes, the bitumen will float to the surface of the liquid, leaving a very clean sand in the bottom of the vessel. It will of course be appreciated that the concentrations of the alkaline solutions vary throughout a wide range and the invention contemplates the use of any alkaline substance and of solutions containing any desired concentration of hydroxyl ions. Likewise it will be realized that various concentrations may be used according to variations allowed in the time of stirring. Although concentrations of various degrees may be employed in carrying out the process, experiments have disclosed that the smallest concentration which may be employed is approximately $10^{-7}$ moles per liter, and hence, the invention contemplates the employment of concentrations greater than that of $10^{-7}$ moles per liter.

In experimenting with the methods used by other investigators in order to compare the results with those obtained with our improved process, it has been found that when the bituminous sand is treated with a hot sodium hydroxide solution or other solution furnishing hydroxyl ions and is stirred with only the ordinary stirring devices a fair separation occurs at the end of one hour or longer. Although all processes are necessarily prolonged in large scale operations, this same relationship exists in the time required for separation.

Although there may be successfully used in these processes solutions of many other substances, such as sodium carbonate, sodium bicarbonate, sodium silicate, sodium borate, sodium phosphate, sodium sulfide, ammonium hydroxide, and potassium hydroxide, our best results were obtained with sodium hydroxide solutions.

The process may be carried out on a large scale by making use of a ball mill or tube mill for agitating the bituminous sand with the reagent. Our mill is so constructed that the process may be carried out either intermittently or continuously. One way in which we carry out the process is as follows: The bituminous sand is given a preliminary crushing for the purpose of breaking up large lumps, and is then heated to about 70° C. The heated material is then charged into the ball mill where it is thoroughly agitated for about fifteen minutes with approximately 25% by weight of tenth molal sodium hydroxide solution. During this process the contents of the ball mill are kept at a temperature of about 80° C. by heating externally. The pulpy mass from the ball mill is then transferred to a separating tank where it is stirred with hot water. After stirring for fifteen minutes, the bitumen floats to the surface of the water. The sand tailings which collect in the bottom of the tank are very clean, containing only about 0.3% bitumen.

In large scale comparative experiments, it was found that our improved process involving "vigorous agitation" resulted in a more rapid and efficient separation than could possibly be obtained if only "mild stirring" devices were used.

We claim:

1. An improvement in processes for separating bitumen from bituminous sands which comprises adding a solution of sodium hydroxide to the bituminous sand and subjecting the mixture to an abrasive grinding action at a temperature of approximately 70° C., drawing off the mixture and adding water thereto to effect the final separation of the bitumen from the sand.

2. A process for removing bitumen from bituminous sands comprising abrasively mixing the sand in the presence of an alkaline solution of sodium hydroxide, drawing off the mixture and adding water thereto to effect separation of the bitumen and sand.

3. A process for removing bitumen from bituminous sands comprising abrasively mixing the sand at a temperature of approximately 70° C. in the presence of an alkaline solution of sodium hydroxide, drawing off the mixture and adding water thereto to effect separation of the bitumen and sand.

In testimony that we claim the foregoing we hereunto affix our signatures.

CECIL T. LANGFORD.
ABRAHAM J. TEPLITZ.